T. STARCH.
CULTIVATOR ATTACHMENT.
APPLICATION FILED AUG. 20, 1919.
1,351,704.
Patented Aug. 31, 1920.
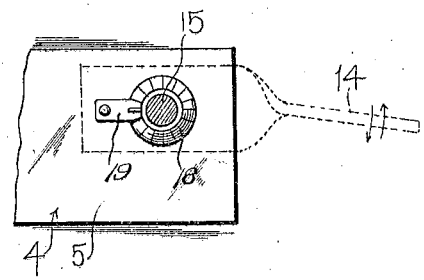
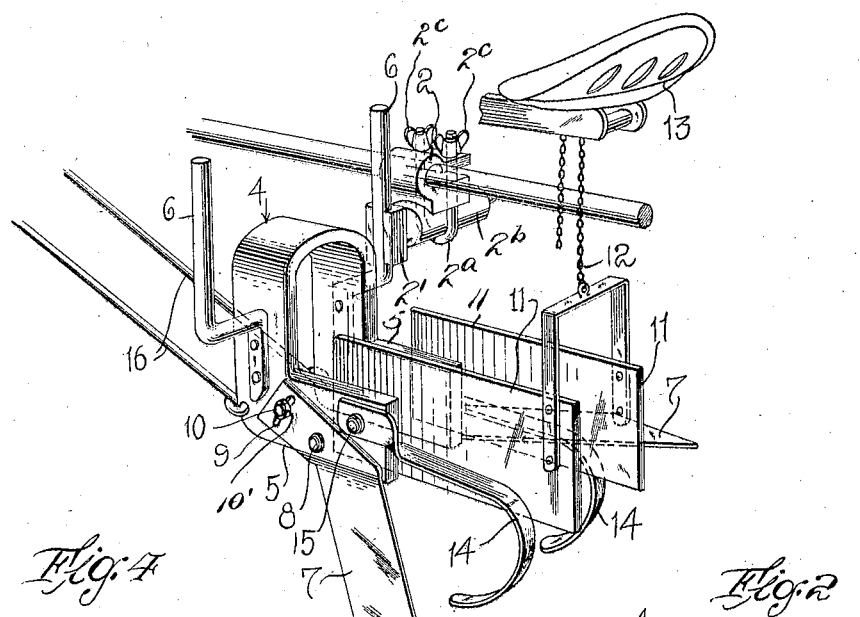
Inventor
Thomas Starch

UNITED STATES PATENT OFFICE.

THOMAS STARCH, OF RALLS, TEXAS.

CULTIVATOR ATTACHMENT.

1,351,704. Specification of Letters Patent. Patented Aug. 31, 1920.

Application filed August 20, 1919. Serial No. 318,681.

*To all whom it may concern:*

Be it known that I, THOMAS STARCH, a citizen of the United States, residing at Ralls, in the county of Crosby and State of Texas, have invented certain new and useful Improvements in Cultivator Attachments; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cultivator attachments for use in listing plants, etc., and consists of a simple and efficient device of this nature which may be easily and quickly attached to riding cultivators.

My invention comprises various details of construction, combination and arrangement of parts which will be hereinafter fully described, shown in the accompanying drawings and then specifically defined in the appended claims.

My invention is illustrated in the accompanying drawings which, with the letters of reference marked thereon, form a part of this application, and in which:

Figure 1 is a perspective view of my improved attachment as applied to a cultivator, Fig. 2 is a fragmentary view in elevation showing the means for attaching the scrapers, Fig. 3 is a fragmentary view showing the means for adjustably attaching the spring teeth, Fig. 4 is a detail perspective of one of the guards detached, Fig. 5 is a fragmentary detail view of one of the guards and spring tooth bars, showing particularly the means for permitting adjustment thereof.

4 designates an inverted U-shaped member which is held in an inverted position in a suitable manner, as by means of angle rods 6 secured to opposite sides thereof and engaging socket members 2' (one thereof being shown in Fig. 1), each of which is retained on a rod 1 by means of a clamping collar 2, and a U-shaped clamping rod $2^a$ passing through said clamping collar and around the cross-sectionally annular portion $2^b$ of a socket member 2', said clamping rod $2^a$ having threaded terminals screwed on which are winged clamping nuts $2^c$.

The U-shaped member 4 is provided at its lower end with rearward extending angled extensions 5, 5, to which are adjustably secured scraper blades 7, pivoted to said extensions as at 8, each scraper blade, toward its forward and top end, having a transversely extending slot 9 through which, and through the corresponding angled extension 5, passes a bolt 10 having a clamping nut 10' screwed thereon.

Adjustably mounted toward the free end of each extension 5 is a plate 11, constituting a guard. In this instance the adjustability of said plates is secured by the following means: Small ratchet wheels $11^x$ are secured rigidly to the guards 11 and are engaged by spring pressed pawls 11' carried by the inner sides of the extensions 5. Bolts 15 pass axially through said ratchet wheels, and also pass through the extensions 5 and through the ends of spring tooth bars 14 disposed on the side of the extensions 5 opposite to that on which the guards 11 are disposed, and nuts 16' screwed on the threaded ends of said bolts secure the guards 11 and spring tooth bars 14 in adjusted position.

Suitable means to assist in supporting the weight of the guards 11, 11 may be provided, such means being herein shown as a U-shaped support or bracket 17, secured to the rear ends of said guards, a flexible connection, such as a chain 12, being secured to one end of the bridge portion of said U-shaped bracket, and being secured in a taut position to the under side of the seat 13 of the cultivator.

The spring tooth bars 14 are, as said, adjustably supported upon the bolts 15, which constitute common pivotal supporting means for said bars and said guards 11. Said bolts pass axially through small ratchet wheels 18 rigidly carried by the bars 14, and spring pressed ratchets 19, carried by the extensions 5, engage said ratchet wheels.

Auxiliary bracing rods 16, 16 may be attached at one end thereof to the forward lower portion of the U-shaped member 4, and at their other end to any convenient part of the cultivator frame, these rods serving to brace the structure, comprising my invention, against any tendency of being pulled out of proper position.

In operation, after the device is applied to a cultivator, the fender may be raised and lowered and held in different positions to regulate the amount of soil desired to be fed to the plants by the spring teeth, and the cutter blades may also be held in different adjusted positions. The device is easily and quickly applied to riding cultivators by simply utilizing the shovel supports to receive the attachment which engage the sockets in the collars upon the cultivator shaft.

What I claim to be new is:

1. An attachment for cultivators, consisting of an inverted U-shaped member having rearward projecting angled extensions at its lower end, means for securing said U-shaped member to a cultivator, spring tooth bars and plate guards disposed on opposite sides of each of said extensions, and means for adjustably securing said spring tooth bars and plate guards to said extensions, including a common pivotal supporting member for the tooth bar and plate guard carried by each of said extensions.

2. An attachment for cultivators, consisting of an inverted U-shaped member having rearward projecting angled extensions at its lower end, means for securing said U-shaped member to a cultivator, spring tooth bars and plate guards disposed on opposite sides of each of said extensions, and means for adjustably securing said spring tooth bars and plate guards to said extensions, including a common pivotal supporting member for the tooth bar and plate guard carried by each of said extensions, ratchet wheels carried by said spring bars and plate guards, and spring pressed pawls carried by said extensions and engaging said ratchet wheels.

In testimony whereof I hereunto affix my signature.

THOMAS STARCH.